US00RE40994E

(19) United States
(12) Reissued Patent
Murakami et al.

(10) Patent Number: US RE40,994 E
(45) Date of Reissued Patent: Nov. 24, 2009

(54) INK JET RECORDING HEAD

(75) Inventors: Shuichi Murakami, Kanagawa (JP); Keiji Tomizawa, Kanagawa (JP)

(73) Assignee: Canon Kabushiki Kaisha, Tokyo (JP)

(21) Appl. No.: 11/633,616

(22) Filed: Dec. 5, 2006

Related U.S. Patent Documents

Reissue of:
(64) Patent No.: 6,935,723
Issued: Aug. 30, 2005
Appl. No.: 10/621,347
Filed: Jul. 18, 2003

(30) Foreign Application Priority Data

Jul. 24, 2002 (JP) ..... 2002-215253

(51) Int. Cl.
*B41J 2/15* (2006.01)
*B41J 2/145* (2006.01)

(52) U.S. Cl. ..... 347/40; 347/65
(58) Field of Classification Search ..... 347/40, 347/65, 85
See application file for complete search history.

(56) References Cited

U.S. PATENT DOCUMENTS

| | | | | |
|---|---|---|---|---|
| 4,657,631 | A | 4/1987 | Noguchi | |
| 5,218,376 | A | 6/1993 | Asai | |
| 5,489,930 | A | 2/1996 | Anderson | |
| 6,155,673 | A | 12/2000 | Nakajima et al. | |
| 6,161,923 | A | 12/2000 | Pidwerbecki et al. | |
| 6,302,518 | B1 * | 10/2001 | Kudo et al. | 347/42 |
| 6,309,054 | B1 | 10/2001 | Kawamura et al. | |
| 6,350,016 | B1 | 2/2002 | Tachihara et al. | |
| 6,443,561 | B1 | 9/2002 | Murakami | |
| 6,520,626 | B1 | 2/2003 | Murakami | |
| 6,540,335 | B2 | 4/2003 | Touge et al. | |
| 6,676,241 | B2 | 1/2004 | Yabe | |
| 6,755,510 | B2 | 6/2004 | Murakami et al. | |
| 6,830,317 | B2 | 12/2004 | Tsuchii et al. | |
| 6,971,736 | B2 | 12/2005 | Tomizawa et al. | |
| 6,984,026 | B2 | 1/2006 | Tomizawa et al. | |

FOREIGN PATENT DOCUMENTS

| | | |
|---|---|---|
| JP | 4-10940 A | 1/1992 |
| JP | 4-10941 A | 1/1992 |
| JP | 6-45242 B2 | 6/1994 |
| JP | 6-312506 | 8/1994 |

* cited by examiner

*Primary Examiner*—Thinh H Nguyen
(74) *Attorney, Agent, or Firm*—Fitzpatrick, Cella, Harper & Scinto

(57) ABSTRACT

An ink jet recording head is provided with a flow path structure capable of enhancing the discharge power, filtering performance, and discharge frequency characteristics even with liquid droplets being made small. The flow path structure thus provided in a supply path makes the flow path sectional area right angled to the liquid flow direction small, and changes the area (shape) thereof at the same time. The flow path structure is formed by a flat square column serving as a first structure for closing a part of the supply path, and plural columns serving as a second structure for closing a part of the supply path. The square column is formed on the base plate in the entire width thereof to close the supply path on the base plate side. The plural columns are arranged on the square column symmetrically with respect to the center of the supply path, and extended from the square column to the discharge port plate in the height direction of the supply path.

6 Claims, 8 Drawing Sheets

INK JET RECORDING HEAD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an ink jet recording head used for an ink jet recording apparatus that performs recording by forming ink liquid droplets with ink to be discharged.

2. Related Background Art

A printer, a copying machine, a printing device for facsimile equipment, and the like, are structured to print images, which are formed by dot-patterns, on a printing medium (also called a recording sheet or a recording medium), such as paper, thin plastic plate, or cloth, in accordance with image information.

Printing apparatuses of the kind are divided into those of ink jet type, wire-dot type, thermal type, laser beam type, and others by the printing method adopted by each of them, respectively.

Of those apparatuses, the one that adopts ink jet method is such that it executes printing (recording) by discharging ink from the printing head to a printing medium. It can print highly precise images at high speed. Further, being of non-impact type, the printing apparatus adopting this method generates a lesser amount of noises, and also, among many advantages it has, it can print color images easily using multiple colors of ink. Of the ink jet methods, the so-called bubble jet method is particularly effective, in which ink is discharged from nozzle by means of bubbling energy exerted when ink is given film boiling by heater.

FIGS. 9A, 9B, and 9C are views that illustrate the conventional bubble jet type ink jet recording head (also, referred to as a "bubble jet printing head"). FIG. 9A is a plan perspective view that shows one of plural nozzles of the conventional head. FIG. 9B is a cross-sectional view taken along the line from the discharge port to the ink flow path represented in FIG. 9A. FIG. 9C is a cross-sectional view taken along line 9C—9C in FIG. 9B. Here, in FIG. 9B, the flow path formation member 107 is shown as a transparent member.

As shown in FIGS. 9A, 9B, and 9C, the bubble jet printing head is provided with a heater 102 on the upper layer of the base plate 101, which serves as electrothermal converting element. Then, on the base plate 101, there are arranged the bubbling chamber 103, which is a space that contains the heater 102, formed to face the arrangement surface of the heater 102; the ink discharge nozzle 104, which enables ink to be discharged from the bubbling chamber 103 in a specific direction; and the plate type flow path formation member 107 that faces the arrangement surface of heater 102 to form the supply path 106 to conduct ink from the supply chamber 105 to the bubbling chamber 103. Here, in this specification, the portion between the bubbling chamber 103 and the discharge port 108, which is an opening for discharging ink liquid droplet externally from the head, is defined as the ink discharge nozzle 104.

For the bubble jet type recording head described above, it is necessary to make the liquid droplet small so as to make the dot diameter formed on a printing medium small in order to attain printing in higher resolution. It is possible to make the liquid droplet small like this by downsizing the area of the discharge port, which is the opening at the tip of the ink discharge nozzle.

However, the following problem is encountered particularly when the liquid droplet is made small. With the area of discharge port being made small, the viscosity resistance is increased in the discharge direction, and there is a need for providing large power for operating discharges. The viscosity resistance can be expressed by the following equation (1).

$$\text{Viscosity resistance} = \eta \int_0^{i} \frac{G(x)dx}{S(x)^2} \qquad \text{Equation (1)}$$

Here, for example, the viscosity resistance becomes extremely high in the discharge direction if the diameter of discharge port is made smaller than Φ10 μm, and the problem of the kind is particularly encountered conspicuously. Also, with the increased flow resistance in the discharge direction, it becomes more difficult for ink to flow toward the discharge port side when bubbling occurs by use of the electrothermal converting element that serves as an energy generating element. It becomes rather easier for ink to flow toward the supply path side. As a result, the development of bubble is allowed to be larger to the supply path side. Conventionally, the development of bubble to the supply path side is suppressed to make the development easier to the discharge port side, and in order to increase the distribution of energy to the discharge port side, the width of flow path of the supply path on the side opposite to the discharge port side is made narrower. However, with the simple arrangement of making the width of flow path narrower, it takes more time inevitably to refill ink in the discharge port portion after the execution of discharge. As a result, the characteristics of discharge frequency (also, referred to as the "f characteristics") are deteriorated.

Further, in a case where the electrothermal converting element is used as the energy generating element, and if it is required to provide large power for discharging the liquid droplet, which is arranged to be a smaller one, the temperature of element base plate is caused to rise due to the input of increased electric power. As a result, bubbling becomes instable to allow defective discharges to occur. Therefore, in order to prevent such temperature from rising, recording should be made slower at the sacrifice of more time to be taken. Then, a problem of slower speed recording is encountered.

Also, it is known that defective discharges of the ink jet recording apparatus may take place if dust particles are allowed to enter the discharge port portion and mixture thereof occurs therein. Conventionally, as the countermeasure to prevent the occurrence of defective discharges due to the mixture of such dust particles, there have been provided, as shown in FIG. 9A, the columns that serve as filters 109 at the entrance of the supply path 106 up to the height of the supply path 106 at specific intervals so as to prevent dust particles from being mixed.

To obtain the f characteristics, however, there is a need for making the height of the supply path larger as a structure needed to lower the flow resistance in the supply path, and also, the thickness (diameter) of each column that constitutes the filter 109 needs to be fixed in the height direction of the supply path. Therefore, as shown in FIG. 9B, the length of the gap between columns serving as filters 109 is determined by the height of the supply path 10, and in some cases, it may become impossible to provide sufficient filtering function as intended for the purpose. Also, the smaller the diameter of the discharge port, the smaller should be made the opening area of the filter. However, since the thickness (diameter) of each filter provided for the supply path is fixed eventually in the height direction of the supply path, there is no alternative but to simply make the gap between the columns constituting filters smaller. As a result, it becomes inevitable to take more time to refill ink in the discharge port after discharge. Thus, in some cases, the characteristics of discharge frequency (also, referred to as the "f characteristics") are lowered after all.

SUMMARY OF THE INVENTION

Under the circumstances, therefore, the present invention is designed to aim at the provision of an ink jet recording head having the flow path structure capable of enhancing the discharge power, filtering performance, and discharge frequency characteristics even with a liquid droplet being made smaller.

In order to achieve the aforesaid object, the ink jet recording head of the present invention comprises an element base plate provided with plural discharge energy-generating elements for generating a bubble in liquid by thermal energy, and a through opening becoming a supply chamber for conducting (leading) liquid to the discharge energy-generating elements; a flow path forming base plate for forming plural bubbling chambers containing the discharge energy-generating elements on the face of the element base plate having the discharge energy-generating elements thereon, and plural supply paths for conducting liquid to each of the bubbling chambers, and having plural nozzles provided therefor to enable each of the bubbling chambers to be communicated with the outside of the head. This ink jet recording head is provided with a flow path structure having the flow path sectional area right angled to the liquid flow direction becoming the narrowest between the bubbling chamber and the through opening, and the flow path structure changes with difference in level with respect to the direction perpendicular to the face of the element base plate having the discharge energy-generating elements formed thereon.

The ink jet recording head of the present invention, which is structured as described above, demonstrates the following effects:

(1) The development of bubble to the ink supply chamber side can be suppressed to enhance the discharge power.

(2) The f characteristics (discharge frequency characteristics) can be enhanced, while suppressing effectively the development of bubble to the ink supply chamber side by making the flow path sectional section in a part of the flow path narrower, while making the area other than that relatively wide in that part of the flow path.

(3) The filtering performance can be enhanced against the mixture of the dust particles without depending on the height of the flow path.

(4) Simultaneously, the shape of the flow path section is made square to enhance the filtering performance against the mixture of dust particles, while making the shape thereof most effective for upholding the f characteristics.

Conventionally, it has been required to provide a large power for discharging the liquid droplets, which are made smaller. Here, in order to make the flow resistance higher efficiently, it is effective to make the flow path sectional area smaller near the electrothermal converting element with respect to the configuration of flow path section right angled to the liquid flow direction. Then, there is a need for the provision of a structure to make the flow path sectional area of the supply path narrower or close a part of the supply path on the side nearer to the electrothermal converting element in order to suppress the the development of bubble to the supply path side to promote the development thereof more to the discharge port side at the initial stage of bubbling on the surface of the electrothermal converting element. In this respect, whereas the conventional structure allows bubble to be developed to the supply path side, which is opposite to the discharge port side, the structure of the present invention is able to suppress the development of bubble to the supply path side, and the most part of the bubble is developed to the discharge port side for the enhancement of the discharge power. Particularly, in the case of the ink jet recording head, which is communicated with the air outside, the sufficient development of bubble to the discharge port side cannot be made by the corresponding configuration, which is conventionally arranged as shown in FIGS. 9A, 9B, and 9C. With a flow path structure formed in the flow path closer to the electrothermal converting element than the conventional arrangement, which makes the flow path sectional area smaller in accordance with the present invention, it becomes possible to promote the development of bubble to the discharge port side.

Also, should the entire area of the flow path section on the supply path side be made narrower than the bubbling chamber, it results in the extreme deterioration of the discharge frequency characteristics (f characteristics). Here, as the result of studies made by the inventors hereof, it is found that the development of bubble to the supply path side can be effectively suppressed by making the flow path sectional area on the supply chamber side narrower partly than the bubbling chamber, while making the part other than that wider. In the precise studies thereof, it is observed, in particular, that when fluid passes the portion having the relatively wide sectional area on the part of the flow path, the winding-up flow occurs. With this particular flow, the flow from the part of the flow path where the sectional area is relatively narrow is more suppressed, and it is confirmed by the studies of the inventors hereof conclusively that the suppressing effect on the development of bubble to the supply path side is thus obtained more than making the flow path sectional area near the electrothermal converting element small with respect to the shape of flow path section right angles to the liquid flow direction as described above.

In other words, while making studies, the inventors hereof have observed that the flow resistance is made high on the portion having the relatively narrow sectional area in the part of the flow path at the time of refilling process in which ink is refilled from the ink supply chamber to the discharge port after the discharge, and that if there is any corner, ink is liable to remain in such portion. From this observation, it is found that with the provision of the first structure that closes a part of the flow path on the face of the element base plate having the discharge energy-generating elements formed thereon together with the formation of cut-off portion for the first structure in the liquid flow direction, which provides the portion having a relatively narrow sectional area in a part of the flow path, the return of meniscus can be promoted by means of ink remainders in such narrow portion, while the development of bubble to the supply chamber side being suppressed. Thus, it is made clear by the inventors hereof that the provision of the gap for the first structure is effective, and makes it possible to materialize the compatibility with upholding the f characteristics when forming the first structure that closes a part of flow path on the face of the electrothermal converting element for enhancing the discharge efficiency.

Also, for the ink jet recording head, it becomes possible to obtain the filtering performance against the mixture of dust particles in the discharge port portion, while maintaining the height of the flow path, such as the supply path 5, by changing the height of the flow path partly on the flow path sectional area right angled to the liquid flow direction, and forming the column structure in such region, which is aimed at filtering, as shown in FIG. 8B. In other words, the filtering performance can be enhanced without depending on the height of the flow path. In accordance with the present invention, it becomes unnecessary for the gap between columns 3b, which is the filter opening as in the conventional structure shown in FIG. 8A, to depend on the height of the flow path. Therefore, in order to enhance the filtering performance, the shape of filter opening can be made smaller in a desired configuration. For upholding the f characteristics with the same flow path sectional area, it is particularly preferable to make the shape of filter opening square, because with such shape it becomes possible to minimize the stagnating area where fluid does not move at corners. However, in accordance with the present invention, the opening shape of filter portion in the flow path sectional area right angled to the liquid flow direction is made square as shown in FIG. 8B, thus making it possible to obtain the filtering performance against the mixture of dust particles, while upholding the f characteristics. In FIG. 8A, reference numeral 110 denotes a dust particle.

DETAILED DESCRIPTION OF THE PREFERRED EMBODIMENTS

Hereinafter, with reference to the accompanying drawings, the description will be made of the embodiments in accordance with the present invention.

(First Embodiment)

Figure 1:
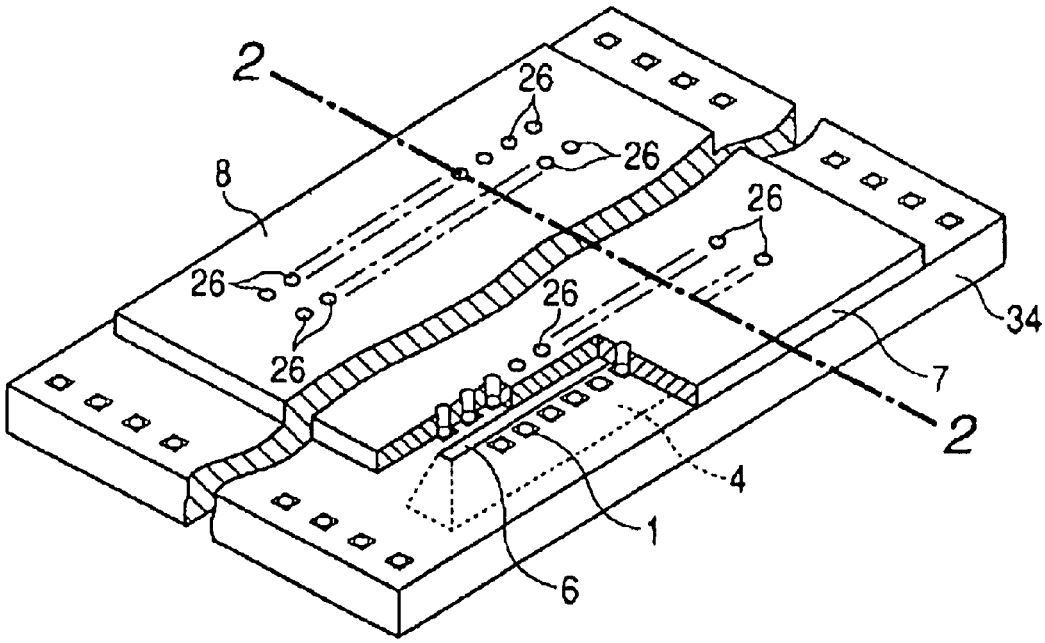
FIG. 1 is a perspective view that shows an ink jet recording head in accordance with a first embodiment of the present invention.
Figure 2:
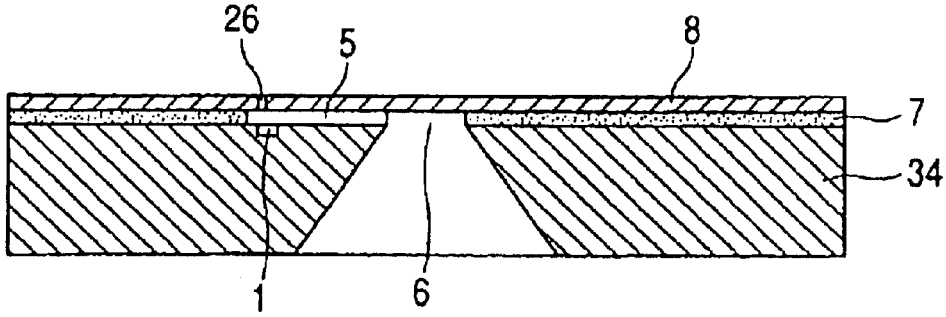
FIG. 2 is a cross-sectional view taken along line 2—2 in FIG. 1.

FIG. 1 is a perspective view that shows an ink jet recording head in accordance with a first embodiment of the present invention. FIG. 2 is a cross-sectional view taken along line 2—2 in FIG. 1. Here, in these figures and others, electrical wiring and others (not shown) needed for driving the electrothermal converting element are not shown. The base plate 34, which is formed by glass, ceramics, plastic, metal, or the like, for example, is used. The material of the base plate 34 is not the essence of the present invention. The material is not necessarily limited if only it can function as a part of the flow path formation member, being functional as a supplying member for the material layer that forms the ink discharge port. Now, for the present embodiment, the description will be made of the case where Si base plate (wafer) is used. As shown in FIG. 2, on one face of the base plate 34, there are formed the electrothermal converting element 1 serving as discharge energy generating means that acts to discharge ink discharge, and the ink supply port 6 configured to be an elongated rectangle. The ink supply port 6 is an opening of the ink supply chamber 4 formed by a through hole in the form of elongated groove provided for the base plate 34. 256 pieces of electrothermal converting element 1 are arranged zigzag for each line in the longitudinal direction at intervals of electrothermal converting elements of 600 dpi on both sides of the ink supply port 6. 512 pieces thereof are arranged in total for the two lines. Further, on one face of the base plate 34, the flow path formation member 7 is provided, and the discharge port plate 8 is bonded thereon. For the flow path formation member 7, plural ink supply paths 5 are formed to conduct ink from the ink supply port 6 to each bubbling chamber on the electrothermal converting elements 1, respectively. Then, for the discharge port plate 8, the ink discharge nozzle is formed so as to enable the bubbling chamber of the flow path formation member 7 to the communicated with the outside, and the opening at the tip of the ink discharge nozzle, which is exposed to the surface of the discharge port plate 8, is made to be the ink droplet discharge port 26.

Figure 3A:
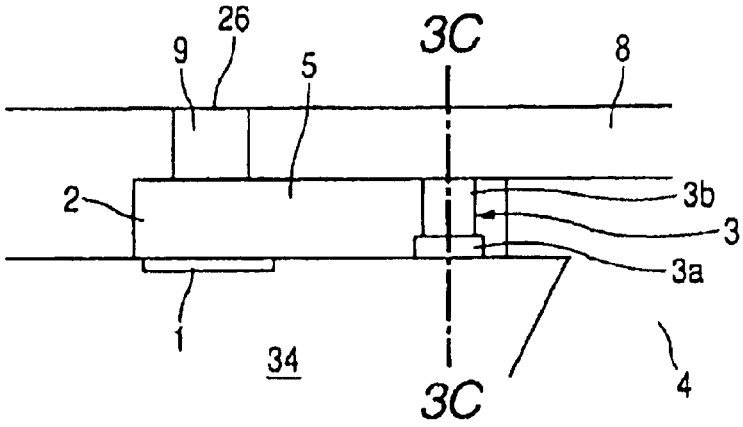
FIG. 3A is a vertically sectional view that shows one of plural nozzles of the ink jet recording head of the first embodiment, taken in the direction perpendicular to the base plate.
Figure 3B:
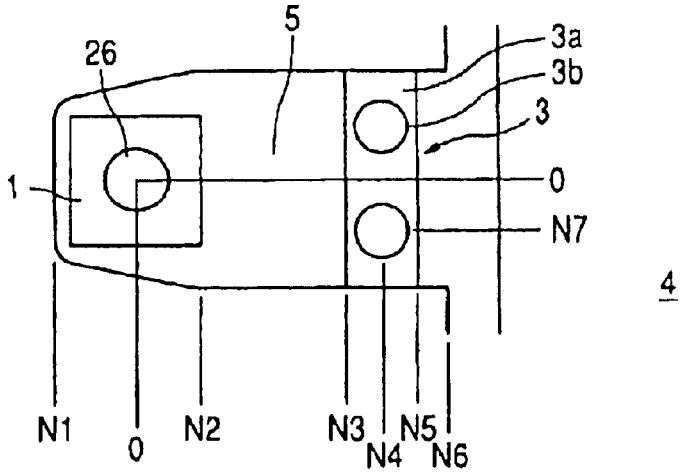
FIG. 3B is a plan perspective view that shows the nozzle observed in the direction perpendicular to the base plate.
Figure 3C:
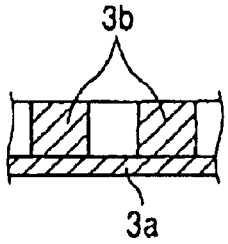
FIG. 3C is a cross-sectional view taken along line 3C—3C in FIG. 3A.

FIG. 3A is a vertically sectional view that shows one of plural nozzles of the ink jet recording head of the first embodiment, taken in the direction perpendicular to the base plate. FIG. 3B is a plan perspective view that shows the nozzle observed in the direction perpendicular to the base plate. FIG. 3C is a cross-sectional view taken along line 3C—3C in FIG. 3A. Here, in these figures, the discharge port plate 8 is shown as a transparent member.

As shown in FIGS. 3A, 3B, and 3C, the ink jet recording head of the present embodiment has the electrothermal converting element (heater, for example) 1 on the upper layer of the base plate 34. On the base plate 34, then, there is arranged the bubbling chamber 2, that is, a space portion formed to face the arrangement surface of the electrothermal converting element 1, containing the electrothermal converting element 1; the ink discharge nozzle 9 for discharging ink from the bubbling chamber 2 in a specific direction; and the flat type discharge port 8, which faces the arrangement surface of the electrothermal converting element 1, and forms the supply path 5 that conducts ink from the supply chamber 4 to the bubbling chamber 2. In FIGS. 3A, 3B, and 3C, the discharge port plate 8 dually serves as the flow path formation member, and the discharge plate and the flow path formation member are not separate ones as shown in FIG. 2. Here, the same effect is obtainable by either one and the same member or by the members provided separately. Also, the electrothermal converting element 1 is in a square form of 18 μm, the height of the ink supply path 5 is 10 μm, the thickness of the flat type discharge plate 8 that dually serves as the flow path formation member is 10 μm, the diameter of the discharge port is 10 μm.

Further, in the supply path 5, there is arranged the flow path structure 3, which makes the flow path sectional area smaller, which is right angled to the liquid flow direction, and changes the area (shape) thereof at the same time. Then, on the portion where the flow path structure 3 of the supply path 5 is provided, the flow path sectional area right angled to the liquid flow direction of the flow path 5 is allowed to change with difference in level in the direction perpendicular to the surface of the base plate 34 where the electrothermal converting element 1 is formed. More specifically, the flow path structure 3 is provided with the flat square column 3a, which serves as a first structure for closing a part of the supply path 5, and plural columns 3b, which serve as second structure to close a part of the supply path 5. The square column 3a is formed across the entire width of the supply path 5 on the base plate 34 to close the supply 5 on the base plate 34 side so that the flow path sectional area is made zero right angled to the liquid flow direction. The plural columns 3b are arranged on the square column 3a symmetrically with respect to the center of the supply path 5, and extended from the square column 3a to the discharge port plate 8 in the height direction of the supply path 5. In other words, the shape (area) of the flow path section right angled to the liquid flow direction of the portion arranged for the flow path structure 3 is formed to close the flow path section in the area of the square column 3a, and further, on the portion of the columns 3b, the flow path section is made square between the columns 3b, which is changed with difference in level.

Figure 4A:
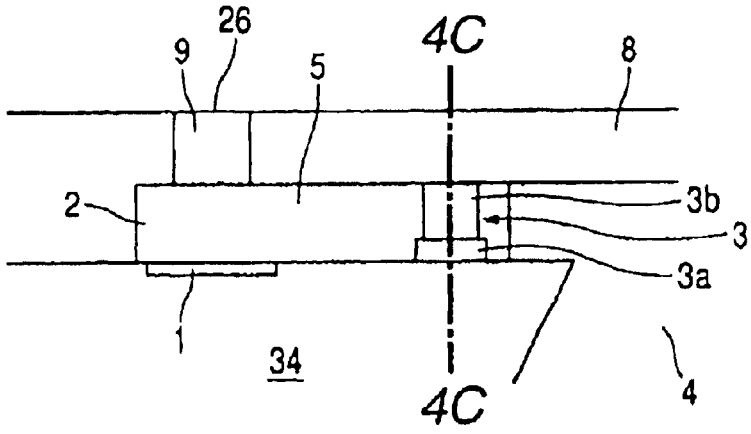
FIG. 4A is a vertically sectional view that shows one of plural nozzles of an ink jet recording head of a second embodiment, taken in the direction perpendicular to the base plate.
Figure 4B:
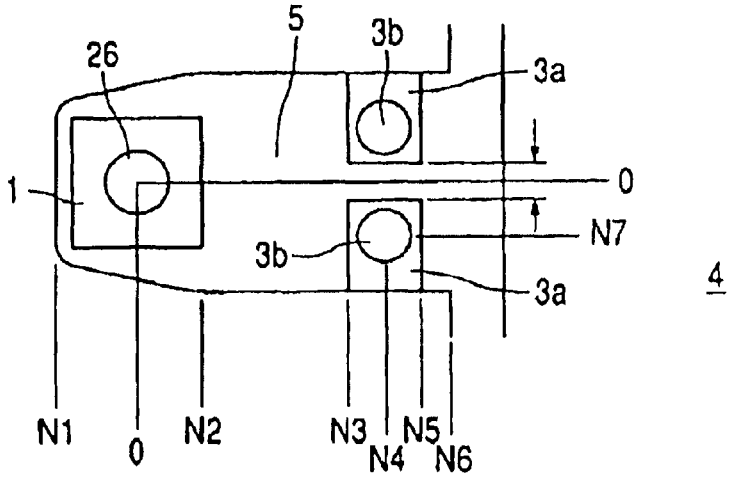
FIG. 4B is a plan perspective view that shows the nozzle observed in the direction perpendicular to the base plate.
Figure 4C:
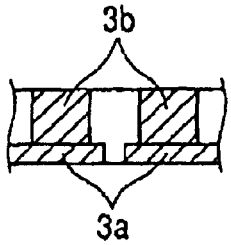
FIG. 4C is a cross-sectional view taken along line 4C—4C in FIG. 4A.

Here, in FIGS. 4B and 4C, two columns 3b are arranged with a designated gap. However, the number and shape of the columns 3b are not necessarily as described here. Also, in the specification hereof, the widthwise direction of the supply path 5 is defined to be right angled to the liquid flow direction of the supply path 5, and in parallel with the main surface of the base plate 34. The height of the supply path 5 is defined to be right angled to the liquid flow direction of the supply path 5, and perpendicular to the main surface of the base plate 34.

In accordance with the present embodiment, the distance from the center O of the electrothermal converting element to each position N1 to N7 of the ink supply path 5 in the longitudinal direction shown in FIG. 3B is: N1=11 μm, N2=9 μm, N3=27 μm, and N4=32 μm, N5=37 μm, and N6=43 μm. The diameter of the column 3b of the flow path structure 3 is Φ8 μm. Also, the distance from the center O of the electrothermal converting element to the position N7 in the direction right angled to the longitudinal direction of the ink supply path 5 and substantially in parallel with the main surface of the base plate 34 is 7.5 μm.

Therefore, as shown in FIG. 3C, the gap between the columns 3b on the square column 3a becomes a square of 7 μm per side. With respect to the direction substantially perpendicular to the main surface of the base plate 34, the thickness of the square column 3a is 3 μm, and the height of the column 3b is 7 μm.

The present embodiment adopts the discharge method (the so-called bubble through method) in which the bubble at the time of giving film boiling to ink by means of the electrothermal converting element 1 is communicated with the air outside through the ink discharge nozzle 9.

The inventors hereof have made precise studies on the ink jet recording head provided with the ink supply path having such shape. Then, it has been observed that the development of bubble to the supply path 5 side is suppressed and that the discharge speed is improved from 11 m/s to 12 m/s. It is then confirmed that there are effects accordingly. This is due to the fact that with the provision of the flow structure 3 on the upstream side of the supply path 8 of the bubbling chamber 2, a part of the flow path sectional area of the supply path 8 is made relatively narrower.

Also, the flow path structure 3 functions as filters. Here, it is unnecessary to depend on the height of the supply path 5 to form the shape of the gap between columns 3b, which serves as the filter opening. Therefore, in order to enhance the filtering efficiency, the opening shape of the filter can be made square and small. With the square form of filter opening, it becomes possible to minimize the stagnating region at each corner where fluid does not flow. Thus, as compared with the rectangular opening shape, the f characteristics can be enhanced.

(Second Embodiment)

FIG. 4A is a vertically sectional view that shows one of plural nozzles of an ink jet recording head of a second embodiment, taken in the direction perpendicular to the base plate. FIG. 4B is a plan perspective view that shows the nozzle observed in the direction perpendicular to the base plate. FIG. 4C is a cross-sectional view taken along line 4C—4C in FIG. 4A. Hereunder, the description will be made mainly of the aspects that differ from those of the first embodiment.

In accordance with the present embodiment, the electrothermal converting element is square of 18 μm. The height of the ink supply path 5 is 10 μm. The thickness of the discharge port plate 8, which dually serves as the flow path formation member, is 10 μm. The diameter of the discharge port is 9 μm.

Then, as shown in FIGS. 4A, 4B, and 4C, the flow path structure 3 is provided in the supply path 5 in order to make the flow path section right angled to the liquid flow direction smaller and changes the area (shape) at the same time, and the portion of the supply path 5 where the flow path structure 3 is provided the flow path sectional area right angled to the flow path direction of the supply path 5 are changed with difference in level with respect to the direction perpendicular to the surface of the base plate 34 having the electrothermal converting element 1 formed therefor. More specifically, the flow path structure 3 is formed by a flat square column 3a serving as a first structure that closes a part of the supply path 5, and plural columns 3b serving as a second structure that closes a part of the supply path 5. Unlike the first embodiment, the square column 3a of the present embodiment is formed on the base plate 34 in the widthwise direction of the supply path 5, and the center thereof is cut by a specific width in the longitudinal direction of the supply path 5. The plural columns 3b are arranged symmetrically on the square column 3a with respect to the center of the supply path 5, and extended in the height direction of the supply path 5. In other words, the shape (area) of the flow path section right angled to the liquid flow direction on the portion where the flow path structure 3 is provided forms the flow path with the cut-off portion of the square column 3a, and further, on the portion of the column 3b, it changes with difference in level as the square flow path section, which is larger than the flow path sectional area formed by the aforesaid cut-off portion.

In FIGS. 4A, 4B, and 4C, each one of the columns 3b is arranged for the portion of the square column 3a where no cut-off is provided. However, the number and shape of columns 3b are not necessarily confined.

In accordance with the present embodiment, the distance from the center O of the electrothermal converting element to each position N1 to N7 of the ink supply path 5 in the longitudinal direction shown in FIG. 4B is: N1=11 μm, N2=9 μm, N3=27 μm, and N4=32 μm, N5=37 μm, and N6=43 μm. The diameter of the column 3b of the flow path structure 3 is Φ8 μm. Also, the distance from the center O of the electrothermal converting element to the position N7 in the direction right angled to the longitudinal direction of the ink supply path 5 and substantially in parallel with the main surface of the base plate 34 is 7.5 μm. With respect to the direction substantially perpendicular to the main surface of the base plate 34, the thickness of the square column 3a is 3 μm, and the height of the column 3b is 7 μm. These dimensions are the same as those of the first embodiment. The gap of the cut-off of the square column 3a of the flow path structure 3, which is characteristically provided for the present embodiment, is 4 μm.

In accordance with studies made of the present embodiment, it has been confirmed that it produces the same effect as the first embodiment on the development of bubble to the ink supply chamber side. Also, the discharge speed has been improved from 11 m/s to 12 m/s, the effect thereof is confirmed. For the structure thus arranged here, the development of bubble to the supply chamber 4 side should become larger than that of the first embodiment simply in consideration of the sectional area of the flow path, which is more on the supply chamber 4 side than the bubbling chamber 2. However, according to the precise observation made by the inventors hereof, the amount of development of bubble is the same as that of the first embodiment. Thus, after the detailed studies thereof, it is assumed by the inventors hereof that when the flow of liquid to the supply chamber 4 side passes the flow path structure 3 at the time of bubbling, the development of bubble is suppressed by the winding flow, which is generated by the flow of fluid on the portion of the column 3b where the flow path sectional area of the flow path structure 3 becomes relatively large, so that the flow from the cut-off portion of the square column 3a on the base plate 34 is impeded at the time of bubbling. In other words, due to this winding flow, the flow from the cut-off portion of the square column 3a of the flow path structure 3, which provides the region where the flow path sectional area becomes relatively narrow, is more suppressed to make the same effect as the first embodiment obtainable.

Further, when ink is refilled in the discharge port after discharge (hereinafter referred to as refilling), it becomes possible to obtain the supply of ink from the cut-off portion of the square column 3a on the base plate 34, and the refilling is completed earlier than that of the first embodiment. This is because the winding flow that is generated at the time of bubbling is not easily generated in the slower flow at the time of refilling. Also, the discharge speed has risen from 11 m/s to 12 m/s, and the effect is equally obtainable as in the case of the first embodiment. Also, with the arrangement of the flow path structure 3 in the supply path 5 near the bubbling chamber 2, it becomes possible to push dust particles to the ink supply chamber 4 side by the flow of liquid at the time of bubbling, thus preventing drawback in operating discharges due to the mixture of dust particles.

(Third Embodiment)

Figure 5A:
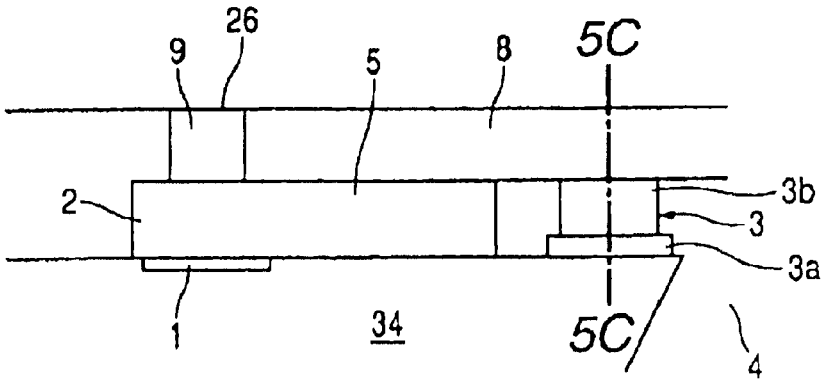
FIG. 5A is a vertically sectional view that shows one of plural nozzles of an ink jet recording head of a third embodiment, taken in the direction perpendicular to the base plate.
Figure 5B:
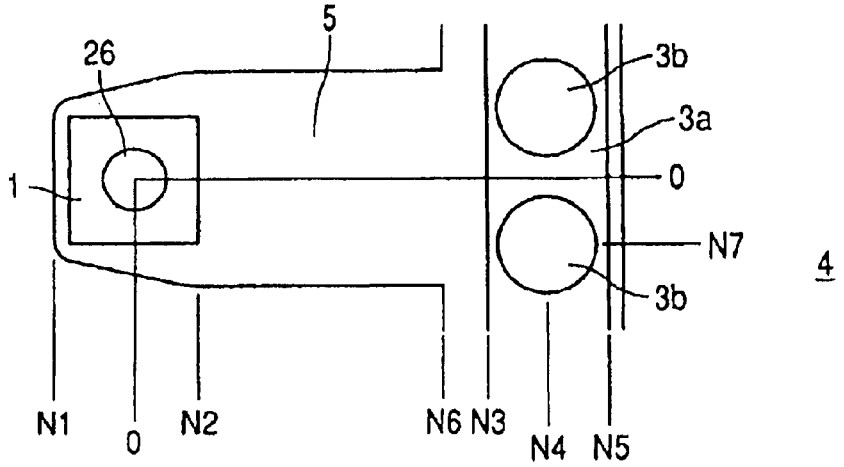
FIG. 5B is a plan perspective view that shows the nozzle observed in the direction perpendicular to the base plate.
Figure 5C:
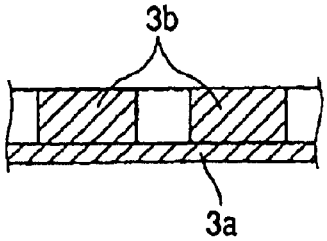
FIG. 5C is a cross-sectional view taken along line 5C—5C in FIG. 5A.
Figure 6A:
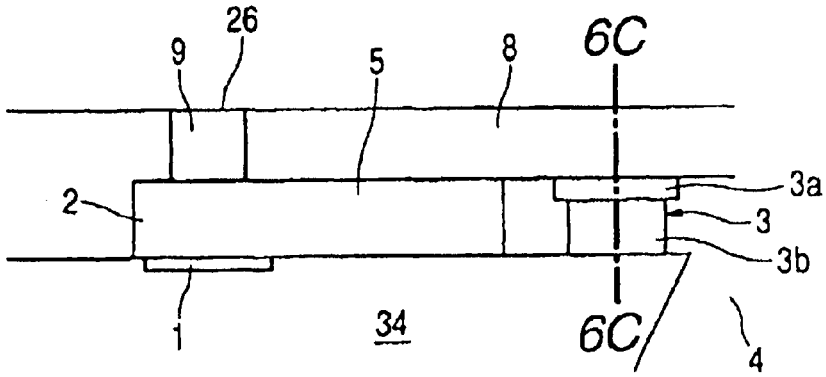
FIGS. 6A, 6B and 6C are views that illustrate the variational example of the nozzle in accordance with the third embodiment.
Figure 6B:
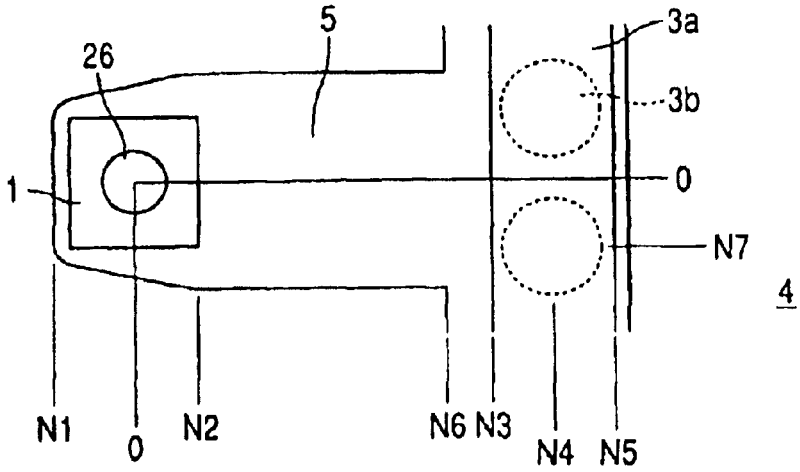
Figure 6C:
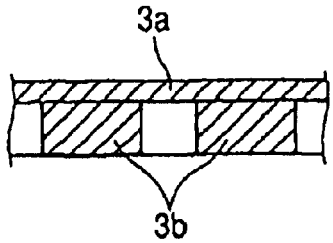

FIG. 5A is a vertically sectional view that shows one of plural nozzles of an ink jet recording head of a third embodiment, taken in the direction perpendicular to the base plate. FIG. 5B is a plan perspective view that shows the nozzle observed in the direction perpendicular to the base plate. FIG. 5C is a cross-sectional view taken along line 5C—5C in FIG. 5A. Also, FIGS. 6A, 6B and 6C are views that illustrate the variational example of the nozzle. Hereunder, the description will be made mainly of the aspects that differ from those of the first embodiment. The present embodiment is characterized particularly in that the flow path structure 3 is provided between the supply path 5 and the opening of the supply chamber 4, not in the supply path 5.

In accordance with the present embodiment, the electrothermal converting element 1 is square of 18 μm. The height of the ink supply path 5 is 10 μm. The thickness of the discharge port plate 8, which dually serves as the flow path formation member, is 10 μm. The diameter of the discharge port is 8 μm.

Then, as shown in FIGS. 5A, 5B, and 5C, the flow path structure 3 is provided in the flow path between the supply path 5 and the opening of the supply chamber 4 in order to make the flow path section right angled to the liquid flow direction smaller and change the area (shape) thereof at the same time. Then, on the portion of the supply path where the flow path structure 3 is provided, the flow path sectional area right angled to the liquid flow direction of the supply path 5 is changed with difference in level with respect to the direction perpendicular to the surface of the base plate 34 having the electrothermal converting element 1 formed therefor. More specifically, the flow path structure 3 is formed by a flat square column 3a serving as a first structure that closes a part of flow path between the supply path 5 and the opening of the supply chamber 4, and plural columns 3b serving as a second structure that closes a part flow path between the supply path 5 and the opening of the supply chamber 4. The square column 3a is formed on the base plate 34 in the widthwise direction of the supply path 5, and closes the flow path between the supply path 5 and the opening of the supply chamber 4 on the base plate 34 side so as to make zero the flow path sectional area right angled to the liquid flow direction. The plural columns 3b are arranged symmetrically on the square column 3a with respect to the center of the supply path 5, and extended from the square column 3a to the discharge port plate 8 in the height direction of the supply path 5. In other words, the shape (area) of the flow path section right angled to the liquid flow direction on the portion having the flow path structure 3 is configured in the area of the square column 3a to close the flow path section, and further, on the portion of the column 3b, to make the flow path section between columns 3b square, and changed with difference in level.

In FIGS. 5A, 5B, and 5C, two columns 3b are arranged at a specific interval, but the number and shape of columns 3b are not necessarily confined.

In accordance with the present embodiment, the distance from the center O of the electrothermal converting element to each position N1 to N7 of the ink supply path 5 in the longitudinal direction shown in FIG. 5B is: N1=11 μm, N2=9 μm, N3=48 μm, and N4=57 μm, N5=66 μm, and N6=43 μm. The diameter of the column 3b of the flow path structure 3 is Φ14 μm. Also, the distance from the center O of the electrothermal converting element to the position N7 in the direction right angled to the longitudinal direction of the ink supply path 5 and substantially in parallel with the main surface of the base plate 34 is 10 μm. Hence, the gap between the columns 3b on the square column 3a is 6 μm. Also, with respect to the direction substantially perpendicular to the main surface of the base plate 34, the thickness of the square column 3a is 4 μm, and the height of the column 3b is 6 μm.

In accordance with the present embodiment, the flow path structure 3, which changes the shape of the opening of the supply path 5 on the supply chamber 4 side, is provided between the supply path 5 and the opening of the supply chamber 4. As a result, it becomes unnecessary for the gap configuration between columns 3b that demonstrates the filtering function to depend on the height between the main surface of the base plate 34 and the backside of the discharge plate 8. Therefore, as shown in FIG. 5C, the gap configuration between columns 3b can be made square and small, and dust particles cannot enter the supply path 5. With no dust particles that enter the supply path 5, it becomes possible to make the influence smaller, such as to raise the discharge speed due to the increased resistance of fluid on the ink supply chamber 4 side by the temporary trap of dust particles. Also, it is easier for such trapped dust particles to move in the flow path structure 3 than in the supply path 5. As a result, the influence that may be exerted on the discharge port is equally reduced. Also, the influence that may be exerted on the discharge performed in the state where dust particles are trapped is made smaller. The dust particles trapped by the flow path structure 3 are also returned to the ink supply chamber 4 side.

Also, for the structure, in which the square column 3a of the flow path structure 3 is formed on the backside of the discharge plate 8 in the widthwise direction of the supply path 5, the plural columns 3b are arranged symmetrically on the square column 3a with respect to the center of the supply path 5, and formed from the square column 3a to the base plate 34 in the height direction of the supply path 5, as shown in FIGS. 6A, 6B and 6C, it is possible to obtain the same effect as the mode shown in FIGS. 5A, 5B, and 5C.

(Fourth Embodiment)

Figure 7A:
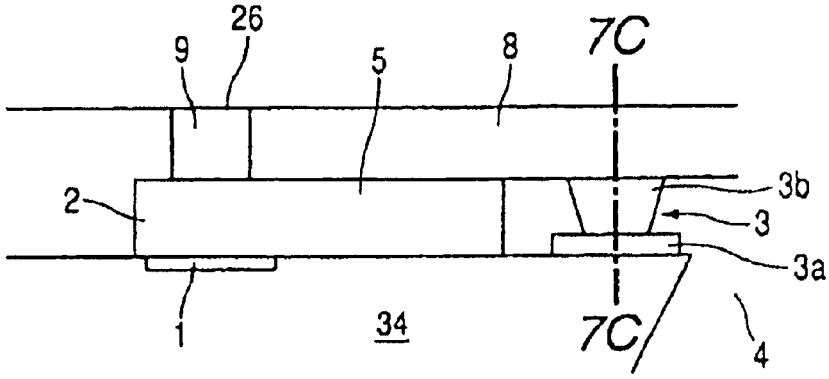
FIG. 7A is a vertically sectional view that shows one of plural nozzles of an ink jet recording head of a fourth embodiment, taken in the direction perpendicular to the base plate.
Figure 7B:
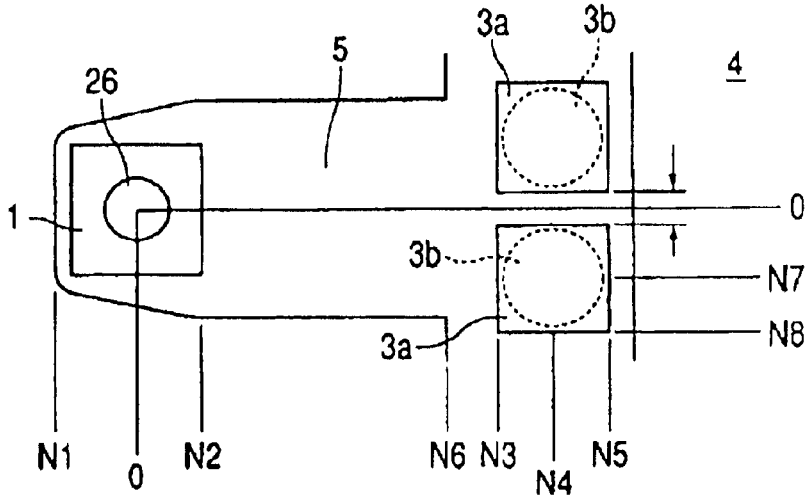
FIG. 7B is a plan perspective view that shows the nozzle observed in the direction perpendicular to the base plate.
Figure 7C:
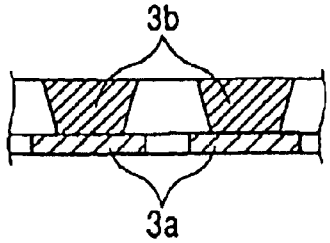
FIG. 7C is a cross-sectional view taken along line 7C—7C in FIG. 7A.
Figure 8A:
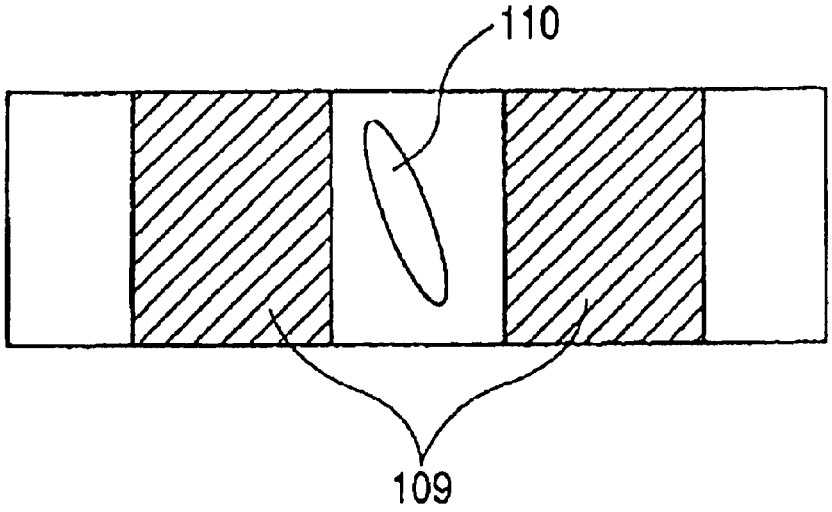
FIGS. 8A and 8B are views that illustrate the comparison between the conventional structure of the nozzle flow path of an ink jet recording head, and the structure of the present invention.
Figure 8B:
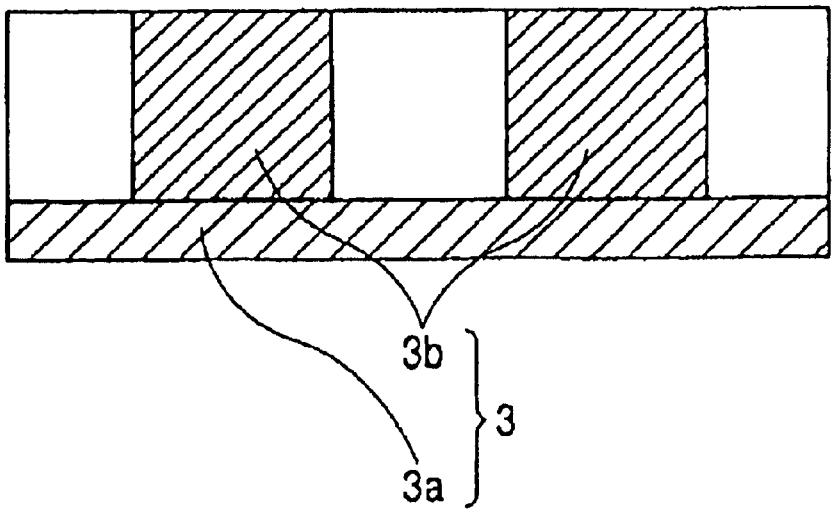
Figure 9A:
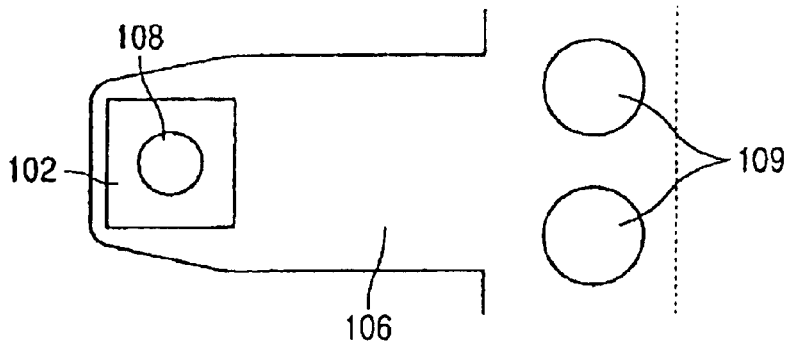
FIG. 9A PRIOR ART
FIGS. 9A, 9B, and 9C are views that illustrate the conventional bubble jet type ink jet recording head.
Figure 9B:
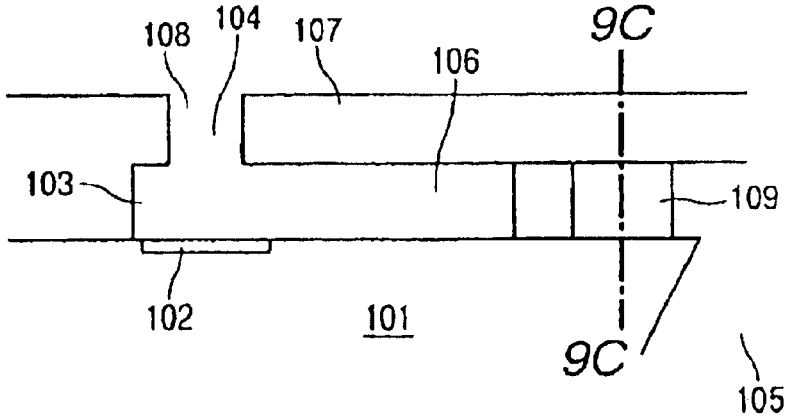
FIG. 9B PRIOR ART
Figure 9C:
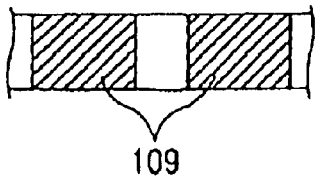
FIG. 9C PRIOR ART

FIG. 7A is a vertically sectional view that shows one of plural nozzles of an ink jet recording head of a fourth embodiment, taken in the direction perpendicular to the base plate. FIG. 7B is a plan perspective view that shows the nozzle observed in the direction perpendicular to the base plate. FIG. 7C is a cross-sectional view taken along line 7C—7C in FIG. 7A. Hereunder, the description will be made mainly of the aspects that differ for the first embodiment. The present embodiment is characterized particularly in that the flow path structure 3 is provided between the supply path 5 and the opening of the supply chamber 4, not in the supply path 5.

In accordance with the present embodiment, the electrothermal converting element 1 is square of 18 μm. The height of the ink supply path 5 is 10 μm. The thickness of the discharge port plate 8, which dually serves as the flow path formation member, is 10 μm. The diameter of the discharge port is 8 μm.

Then, as shown in FIGS. 7A, 7B, and 7C, the flow path structure 3 is provided in the flow path between the supply path 5 and the opening of the supply chamber 4 in order to make the flow path section right angled to the liquid flow direction smaller and change the area (shape) thereof at the same time. Then, on the portion of the supply path where the flow path structure 3 is provided, the flow path sectional area right angled to the liquid flow direction of the supply path 5 is changed with difference in level with respect to the direction perpendicular to the surface of the base plate 34 having the electrothermal converting element 1 formed therefor. More specifically, the flow path structure 3 is formed by a flat square column 3a serving as a first structure that closes a part of flow path between the supply path 5 and the opening of the supply chamber 4, and plural columns 3b serving as a second structure that closes a part flow path between the supply path 5 and the opening of the supply chamber 4. The square column 3a is formed on the base plate 34 in the widthwise direction of the supply path 5, and the center thereof is cut off in a specific width in the longitudinal direction of the supply path 5. The plural columns 3b are arranged symmetrically on the square column 3a with respect to the center of the supply path 5, and extended in the height direction of the supply path 5. In FIGS. 7A, 7B, and 7C, each one of columns 3b is arranged on the portion of the square column 3a having no cut-off, respectively, but the number and shape of columns 3b are not necessarily confined.

The present embodiment is arranged to make it possible to expand the diameter of the column 3b in particular.

In accordance with the present embodiment, the distance from the center O of the electrothermal converting element to each position N1 to N7 of the ink supply path 5 in the longitudinal direction shown in FIG. 7B is: N1=11 μm, N2=9 μm, N3=48 μm, and N4=57 μm, N5=66 μm, and N6=43 μm. The diameter of the column 3b of the flow path structure 3 is Φ14 μm. Also, the distance from the center O of the electrothermal converting element to the position N7 in the direction right angled to the longitudinal direction of the ink supply path 5, which is substantially in parallel with the main surface of the base plate 34, is 10 μm. The gap between the columns 3b on the square column 3a is 6 μm accordingly. Also, with respect to the direction substantially perpendicular to the main surface of the base plate 34, the thickness of the square column 3a is 4 μm, and the height of the column 3b is 6 μm.

As one example of the method of manufacture for the ink jet recording head of the present invention, which is also applicable to the embodiment described above, the form of the ink flow path is patterned using photosensitive material on the base plate having energy generating element provided therefor, and then, the covering resin layer is coated and formed on the base plate to cover the formed pattern, and subsequent to the formation of the ink discharge port on the covering resin layer, which is communicated with the ink flow path thus formed, the photosensitive material used for the form is removed for completing the head (refer to the specification of Japanese Patent Publication No. 06-45242). For this method of manufacture, positive type resist is used as the photosensitive material from the viewpoint of easier removal thereof. In accordance with this method of manufacture, it is possible to carry out extremely precise and fine process for the formation of the ink flow path, discharge port, and others with the application of semiconductor lithographical techniques.

Also, for the method of manufacture of the recording head of the embodiment described above, it is fundamentally preferable to follow the methods for manufacturing the recording head using the ink jet recording method as means for discharging ink, such as disclosed in the specifications of Japanese Patent Application Laid-Open No. 04-10940 and Japanese Patent Application Laid-Open No. 04-10941. Each of these specifications describes the ink droplet discharge method having the structure in which the bubble generated by heater is communicated with the air outside. In such method, when the discharge port plate (flow path formation member) is formed by covering resin on the form after the form of ink flow path is prepared by use of positive type resist as in the conventional example, the portion where the light is irradiated cannot be exposed and developed any longer, although depending on the sensitivity of the resist.

As a result, as shown in FIGS. 7A, 7B, and 7C, the tapered shape is formed on the side face of the isolated flow path structure, which should demonstrate the filtering function.

Therefore, in the case of the tapered shape thus formed, the gap between columns tends to be larger in relation to the dust particle trapping. However, in accordance with the present embodiment, the diameter of the column 3b of the flow path structure 3 is expanded in the longitudinal direction thereof. In this case, it is possible to prevent dust particles from entering the supply path 5 by forming the square column 3a on the main surface of the base plate 34, which is positioned on the side where the gap between the columns 3b is expanded.

Also, with the arrangement of the cut-off in a specific width on the center of the square column 3a in the longitudinal direction of the supply path 5, it becomes possible to suppress the flow of liquid to the supply chamber 4 side, when bubble generates the flow, hence obtaining the same effect as the second embodiment.

What is claimed is:

1. An ink jet recording head comprising:

an element base plate provided with plural discharge energy-generating elements for generating bubbles in liquid by thermal energy, and a through-opening becoming a supply chamber for leading liquid to said discharge energy-generating elements; and a flow-path-forming base plate (i) for forming (a) plural bubbling chambers containing said discharge energy-generating elements, respectively, on a surface of said element base plate having said discharge energy-generating elements formed thereon, and (b) plural supply paths for leading liquid to said bubbling chambers, respectively, and (ii) having plural nozzles provided therefor corresponding to said bubbling chambers, respectively, to enable said bubbling chambers to be communicated with the outside of the head, wherein a diameter of each of said nozzles is not greater than a distance between the surface of said element base plate on which said discharge energy-generating elements are formed and a surface of said flow-path-forming base plate opposed to the surface on which said discharge energy-generating elements are formed in said respective supply path, said ink jet recording head is provided with a flow path structure so configured that, for each of said supply paths, a cross-sectional area thereof perpendicular to a liquid flow direction is smallest between said respective bubbling chamber and the through-opening, and said flow path structure is provided with (i) a first structure for closing a part of each of said supply paths, said first structure being formed on the surface of said element base plate having said discharge energy-generating elements formed thereon, and (ii) a second structure formed on said flow-path-forming base plate to be a columnar structure extending from said first structure, said second structure also being for closing a part of each of said supply paths.

2. An ink jet recording head according to claim 1, wherein a shape of a portion of a supply path cross-section perpendicular to the liquid flow direction having the smallest cross-sectional area is square.

3. An ink jet recording head according to claim 1, wherein said first structure comprises one or more square columns, and said second structure comprises one or more columns.

4. An ink jet recording head according to claim 1, wherein the bubbles generated by said discharge energy-generating elements are communicated with the air outside for discharging liquid droplets.

5. An ink jet recording head comprising:

an element substrate having a plurality of discharge energy-generating elements for generating bubbles in liquid by thermal energy and a through-opening becoming a supply chamber for leading liquid to said discharge energy-generating elements;

a discharge port plate opposed to said element substrate and having a plurality of discharge ports opposed to said plurality of discharge energy-generating elements, respectively;

a plurality of supply paths provided in a space sandwiched by said element substrate and said discharge port plate, for supplying liquid to said plurality of discharge ports, respectively, from said through-opening;

a plurality of columnar structures provided for said plurality of supply paths, respectively, and extending from a side of said element substrate to a side of said discharge port plate, wherein, for each of said supply paths, a diameter of said discharge port is not greater than a height of said supply path, and for each of said supply paths, one end of said respective columnar structure is provided on a structural member formed in said supply path to extend across an entire width of the supply path observed from a cross-section of the supply path perpendicular to a direction in which said supply path extends, so that a length of a gap between adjacent columns of said columnar structure, in a height direction of said supply path, is shorter than a diameter of said discharge port.

6. An ink jet recording head comprising:

an element substrate having a plurality of discharge energy-generating elements for generating bubbles in liquid by thermal energy and a through-opening becoming a supply chamber for leading liquid to said discharge energy-generating elements;

a discharge port plate opposed to said element substrate and having a plurality of discharge ports opposed to said plurality of discharge energy-generating elements, respectively;

a plurality of supply paths provided in a space sandwiched by said element substrate and said discharge port plate, for supplying liquid to said plurality of discharge ports, respectively, from said through-opening;

a plurality of columnar structures provided corresponding to said plurality of supply paths, respectively, each of said columnar structures being disposed between an end portion of a respective supply path at a side of said through-opening and said through-opening, said columnar structures extending from a side of said element substrate to a side of said discharge port plate, wherein, for each of said supply paths, a diameter of said discharge port is not greater than a height of said supply path, and for each of said supply paths, one end of said respective columnar structure *is formed on a structural member that* has a width [larger] *greater* than a width of said supply path, observed from a cross-section of said supply path perpendicular to a direction in which said supply path extends, [and is formed on a] *said* structural member *being* formed between [a side] *the end portion* of said supply path *at the side of said through-opening* and said through-opening, so that a length of a gap between adjacent columns of said columnar structure, in a height direction of said supply path, is shorter than a diameter of said discharge port.

* * * * *